United States Patent [19]

Narayan et al.

[11] 4,326,043

[45] Apr. 20, 1982

[54] PROCESS FOR THE PREPARATION OF POLYISOCYANURATE DISPERSIONS MODIFIED WITH HALOGENATED ALCOHOLS AND COMPOSITIONS PREPARED THEREFROM

[75] Inventors: Thirumurti Narayan, Grosse Ile; John T. Patton, Jr., Wyandotte, both of Mich.

[73] Assignee: BASF Wyandotte Corporation, Wyandotte, Mich.

[21] Appl. No.: 225,936

[22] Filed: Jan. 19, 1981

[51] Int. Cl.$^3$ .................. C08G 18/14; C08G 18/77; C08G 18/80; C08K 5/06

[52] U.S. Cl. .................. 521/137; 521/160; 521/161; 521/117; 521/902; 528/49; 528/52; 528/45; 528/73; 544/193; 544/221

[58] Field of Search ............... 521/902, 160, 161, 117, 521/137; 544/193, 221; 528/49, 52, 73, 45; 260/33.2 R

[56] References Cited

U.S. PATENT DOCUMENTS

| | | | |
|---|---|---|---|
| 2,952,665 | 9/1960 | Bunge et al. | 528/45 |
| 3,278,492 | 10/1966 | Herbstman | 521/161 |
| 3,280,066 | 10/1966 | France et al. | 521/902 |
| 3,367,934 | 2/1968 | Tate et al. | 521/161 |
| 3,381,008 | 4/1968 | Steyermark | 544/22 |
| 3,401,133 | 9/1968 | Grace et al. | 528/49 |
| 3,635,907 | 1/1972 | Schulze et al. | 528/49 |
| 3,746,689 | 7/1973 | Narayan et al. | 528/45 |
| 3,759,916 | 9/1973 | Pitts et al. | 521/161 |
| 3,891,579 | 6/1975 | Cenker et al. | 528/49 |
| 4,042,537 | 8/1977 | Dahm et al. | 521/174 |
| 4,092,275 | 5/1978 | Reischl et al. | 521/137 |
| 4,093,569 | 6/1978 | Reischl et al. | 521/137 |
| 4,115,373 | 9/1978 | Henes et al. | 528/73 |
| 4,251,401 | 2/1981 | Reischl | 260/30.8 R |
| 4,255,569 | 3/1981 | Mueller et al. | 544/193 |

Primary Examiner—H. S. Cockeram
Attorney, Agent, or Firm—Norbert M. Lisicki

[57] ABSTRACT

Polyisocyanurate polymers are prepared by polymerization of polyisocyanates in organic solvents employing trimerization catalysts. The polyisocyanates are reacted with halogenated alcohols subsequent to polymerization. These polymers may be dispersed in polyols for the preparation of cellular and non-cellular polyurethane products having improved flame retardant physical properties.

21 Claims, No Drawings

PROCESS FOR THE PREPARATION OF POLYISOCYANURATE DISPERSIONS MODIFIED WITH HALOGENATED ALCOHOLS AND COMPOSITIONS PREPARED THEREFROM

BACKGROUND OF THE INVENTION

1. Field of the Invention

The present invention relates to polyisocyanurate polymers modified with halogenated alcohols, to an improved process for the preparation of polyisocyanurate dispersions, and to cellular and non-cellular polyurethane products prepared from said polyisocyanurate dispersions. More particularly, the invention relates to polyisocyanurate polymers, an improved process for the preparation of polyisocyanurate dispersions of said polymers in polyols, and to cellular and non-cellular polyurethane products with improved flame retardancy prepared employing said dispersions.

2. Description of the Prior Art

The prior art generally teaches the preparation of isocyanurate-modified isocyanate products employing a variety of catalysts. Among these are U.S. Pat. No. 3,996,223 which teaches a process for preparing polyisocyanates containing isocyanurate structures by polymerization in the presence of a mixture of Mannich bases and carbamic acid esters. U.S. Pat. No. 3,645,979 teaches the use of an organic phosphine catalyst to prepare isocyanurate structures. U.S. Pat. No. 3,652,424 teaches a process for the preparation of polyisocyanate compositions containing 5 to 19 percent by weight toluene diisocyanate trimer employing substituted guanidines and isobiguanides as catalysts. U.S. Pat. No. 4,125,491 teaches the preparation of a composition of matter which consists of the reaction product of trimerized toluene diisocyanate with about 0.02 to 0.25 equivalent, based on free isocyanate groups, of an active hydrogen compound which may either be a secondary aliphatic monoamine containing 24 to 36 carbon atoms or a mixture of such amine with an aliphatic alcohol containing 12 to 24 carbon atoms and dispersed in a mixture of toluene and heptane. Not more than 25 percent of the free NCO groups are allowed to react with the active hydrogen compounds. This patent further teaches the use of the dispersions as adhesives or surface coating compositions. Neither the dispersion in polyether polyol or polyester polyol nor the polyurethane compositions using the dispersion of the instant invention are taught in this patent. None of the prior art teaches the preparation of polyisocyanurate polymer which is readily dispersed in a polyol and subsequently employed for the preparation of cellular and non-cellular polyurethane products with improved flame retardancy.

SUMMARY OF THE INVENTION

The present invention relates to an improved process for the preparation of dispersible polyisocyanurate polymers modified with halogenated alcohol, dispersions of the polyisocyanurate polymer in polyols and the improved flame retardant polyurethane products prepared from these polyisocyanurate polyol dispersions.

DESCRIPTION OF THE PREFERRED EMBODIMENT

In accordance with the invention, polyisocyanurate polymers are prepared by polymerization of polyisocyanates using appropriate trimerization catalysts. These polyisocyanurate polymers are then dispersed in polyols. The dispersions of the polyisocyanurate polymers in polyols are then employed for the preparation of polyurethane foams. The polyisocyanurate polymers and dispersions thereof are prepared by several improved procedures over that of copending application Ser. No. 225,934, filed Jan. 19, 1981, and Ser. No. 225,935, filed Jan. 19, 1981.

A. A dispersible polyisocyanurate polymer is prepared by (a) polymerizing an organic polyisocyanate in the presence of an effective amount of a trimerization catalyst, (b) deactivating the catalyst, and (c) reacting the free isocyanate groups remaining in the polymer with a monofunctional halogenated active hydrogen compound. The extent of polymerization is monitored by measuring the free NCO content of the polymerization product. After the NCO content of the mixture has decreased by about 75 percent from the original content, the residual free NCO groups are reacted with the monofunctional halogenated active hydrogen compounds.

B. In another embodiment, a dispersible polyisocyanurate polymer is prepared by (a) partially reacting an organic polyisocyanate with a monofunctional active hydrogen compound, (b) polymerizing said pre-reacted polyisocyanate alone or admixed with unmodified polyisocyanate in an organic solvent in the presence of an effective amount of a trimerization catalyst, (c) deactivating said catalyst, and (d) reacting the free isocyanate groups remaining in the polymer with a monofunctional halogenated active hydrogen compound.

C. A further embodiment is a dispersion of polyisocyanurate polymer in a polyol prepared by (a) polymerizing an organic polyisocyanate in an organic solvent in the presence of an effective amount of a trimerization catalyst to a free NCO content of about 75 percent of the original content, (b) deactivating said trimerization catalyst, and (c) reacting the free isocyanate groups remaining in the polymer with a monofunctional halogenated active hydrogen compound. The products of procedures A-C are then mixed with a polyol and the organic solvent is removed by any appropriate means thereby forming a dispersion of the polymer in the polyol.

More specifically, the polyisocyanurate polymer may be prepared by the polymerization of a 5 to 50 percent solution of an organic polyisocyanate in ethyl acetate or any other suitable solvent or mixtures thereof in the presence of catalytic quantities of a trimerization catalyst. The temperature of the mixture is maintained at about 50° C. for up to four hours at which time the free NCO value of the reaction mixture is reduced to the desired value. Benzoyl chloride is then added to deactivate said catalyst. After maintaining the reaction temperature at 50° C. for about 15 minutes, a monofunctional halogenated active hydrogen compound is reacted with the residual NCO groups. This mixture is allowed to react at 50° C. for 2 hours. If desired, a catalyst such as dibutyltin dilaurate may be employed to increase this reaction rate. The reaction contents are then transferred into the desired polyol while the polyol is stirred at high speeds. The solvent is then removed by stripping at pressures of 2 millimeters of Hg and temperatures of 70° to 80° C.

Either during the mixing or solvent stripping operation, the temperature of the dispersion is preferably not allowed to increase above 100° C. The concentration of polyisocyanurate polymer dispersed in the polyoxyalkylene polyether or polyester polyol may range from 1 to 80 percent by weight, preferably from 5 to 50 percent by weight.

The uncapped polyisocyanurate polymers of the invention may be represented by the following equation when the isocyanate used is difunctional. Comparable structures will be formed when, tri-, tetra- and polyisocyanates are employed.

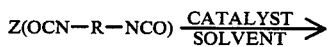

polyisocyanate

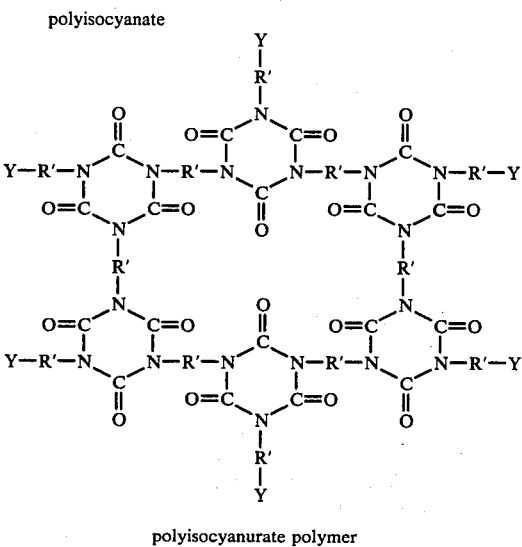

polyisocyanurate polymer wherein Z is at least 3 and Y is

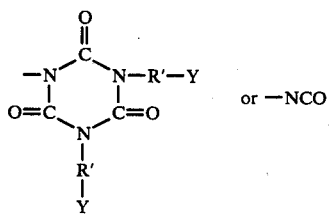

or —NCO and wherein R' is as described hereinafter. Assuming that R' is

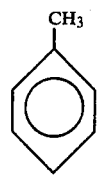

the resulting free NCO content decreases from 48.3 percent to about 8.0 for one of the polymers of this invention, and has an equivalent weight based on end group analysis of 522. The trimer of toluene diisocyanate has a free NCO content of 24.2 percent and an equivalent weight of 174. The equivalent weights of the polyisocyanurate polymers of the invention are greater than 174 and have a free NCO content of less than 24.2 percent. The preferred equivalent weights range from 210 to 4200 with free NCO contents ranging from about 1 to 16 percent based on the polymer weight.

The free NCO contents are determined by methods well known to those skilled in the art. These include the titration of a solution of the polyisocyanate compound with a solution of dibutylamine followed by back titration of the excess unreacted amine with an alcoholic HCl solution. The polyisocyanurate polymers are essentially free of the starting polyisocyanate monomer.

Any halogenated, aliphatic alicyclic, aryl, alkaryl, aralkyl alcohol which is capable of reacting with an isocyanate group may be employed to react with the free isocyanate groups remaining in the polymer. These alcohols have the formula $(X)_n R-OH$ wherein R may be an alkyl containing from 2 to 20 carbon atoms, cycloalkyl containing from 5 to 10 carbon atoms, an aryl, alkaryl, or aralkyl radical containing from 6 to 20 carbon atoms, and X may be chlorine, bromine or iodine and n may range from 1 to 6.

Among the monofunctional active hydrogen compounds which may be employed in the invention are those saturated alcohols which have the following formula:

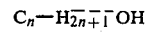

wherein n is 1 to 20. Those contemplated include alcohols such as methyl, ethyl, normal propyl and isopropyl, primary, secondary and tertiary butyl, primary, secondary and tertiary amyl, hexyl, heptyl, octyl, nonyl, decyl, undecyl, eicosyl, methylpentyl, 2-ethylbutyl, 2-ethylhexyl, methylamyl, 2-octanol, 2,6-dimethyl-4-heptanol, 2,6,8-triethyl-4-nonanol and mixtures thereof.

Unsaturated alcohols having the formula

wherein n is 2 to 20, may also be employed. These include such alcohols as vinyl and allyl alcohol.

Representative of the types of halogenated alcohols contemplated herein include for example, 2,3-dichloropropanol, 2,3-dibromopropanol, 2,4,4,4-tetrachlorobutanol, 2,2,2-trichloroethanol, 2,2,2-tribromoethanol, 1,1,1,3,3,3-hexachloro-2-propanol, 1,1-dichloro-2-propanol, 1,3-dibromo-2-propanol, 1,1,1-trichloro-2-propanol, 1,1,3,3-tetrabromo-2-propanol, the isomeric tribromophenols, the isomeric tetrachlorophenols, pentachlorophenol, 2-methylol-1,4,5,6,7,7-hexachlorobicyclo-(2.2.1)-5-heptene and the like.

Also, the reaction products of halogenated alkylene oxides and monofunctional active hydrogen compounds are useful in the present invention. Thus, hydroxyl containing compounds such as 1-methoxy-4,4,4-trichloro-2-butanol, 1-ethoxy-3,3,3-trichloro-2-propanol, 2-methoxy-3,3-dichloropropanol and the like may be used.

The monofunctional active hydrogen compounds are employed in such concentrations that they will react with from 1 to 24 percent of the free NCO groups present. The halogenated alcohols are employed in such concentrations that they will react with from 1 to 24 percent of the free NCO groups present. The ratio of monofunctional active hydrogen compound to halogenated alcohol may range from 1:9 to 9:1.

The organic polyisocyanate employed in the instant invention corresponds to the formula R'(NCO)$_z$ where R' is a polyvalent organic radical which is either aliphatic, arylalkyl, alkylaryl, aromatic or mixtures thereof and z is an integer which corresponds to the valence of R' and is at least 2. Representative of the types of organic polyisocyanates contemplated herein include, for example, 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl)ether, bis(3-isocyanatopropyl)sulfide, 1,7-diisocyanatoheptane, 1,5-diisocyanato-2,2-dimethylpentane, 1,6-diisocyanate-3-methoxyhexane, 1,8-diisocyantooctane, 1,5-diisocyanato-2,2,4-trimethylpentane, 1,9-diisocyanatononane, 1,10-diisocyanatopropyl ether of 1,4-butylene glycol, 1,11-diisocyanatoundecane, 1,12-diisocyanatododecane, bis(isocyanatohexyl) sulfide, 1,4-diisocyanatobenzene, 1,3-diisocuyanato-o-xylene, 1,3-diisocyanato-p-xylene, 1,3-diisocyanato-m-xylene, 2,4-diisocyanato-1-chlorobenzene, 2,4-diisocyanato-1-nitrobenzene, 2,5-diisocyanato-1-nitrobenzene, m-phenylene diisocyanate, 2,4-toluene diisocyanate, 2,6-toluene diisocyanate, mixtures of 2,4- and 2,6-toluene diisocyanate, 1,6-hexamethylene diisocyanate, 1,4-tetramethylene diisocyanate, 1,4-cyclohexane diisocyanate, hexahydrotoluene diisocyanate (and isomers), 1,5-naphthylene diisocyanate, 1-methoxy-2,4-phenylene diisocyanate, 2,4'-diphenylmethane diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-diphenylmethane diisocyanate and 3,3'-dimethyldiphenylmethane-4,4'-diisocyanate; the triisocyanates such as 4,4',4''-triphenylmethane triisocyanate, polymethylene polyphenylene polyisocyanate and 2,4,6-toluene triisocyanate; and the tetraisocyanates such as 4,4'-dimethyl-2,2'-5,5'-diphenylmethane tetraisocyanate. Especially useful due to their availability and properties are toluene diisocyanate, 2,4'-diphenylmethane diisocyanate, 4,4'-diphenylmethane diisocyanate, polymethylene polyphenylene polyisocyanate and mixtures thereof.

The polyisocyanurate polymers of the instant invention may be prepared by employing well-known compounds as trimerization catalysts. Examples of these catalysts are (a) organic strong bases, (b) tertiary amine co-catalyst combinations, (c) Friedel Craft catalysts, (d) basic salts of carboxylic acids, (e) alkali metal oxides, alkali metal alcoholates, alkali metal phenolates, alkali metal hydroxides and alkal metal carbonates, (f) onium compounds from nitrogen, phosphorus, arsenic, antimony, sulfur and selenium, and (g) mono-substituted monocarbamic esters. These include 1,3,5-tris(N,N-dialkylaminoalkyl)-s-hexahydrotriazines; the alkylene oxide and water additives of 1,3,5-tris(N,N-dialkylaminoalkyl)-s-hexahydrotriazines; 2,4,6-tris(dimethylaminomethyl)phenol; ortho, para- or a mixture of o- and p-dimethylaminomethyl phenol and triethylenediamine or the alkylene oxide and water additives thereof, metal carboxylates such as lead octanoate, sodium and potassium salts of hydroxamic acid, and organic boron-containing compounds. Monofunctional alkanols containing from 1 to 24 carbon atoms, epoxides containing 2 to 18 carbon atoms and alkyl carbonates may be used in conjunction with tertiary amine to accelerate the rate of the polymerization reaction.

The concentration of trimerization catalysts that may be employed in the present invention is from 0.001 part to 20 parts of catalyst per 100 parts of organic polyisocyanate. The temperature ranges which may be employed for the polymerization reaction may range from 25° C. to 230° C., preferably from 25° C. to 120° C.

The trimerization catalysts may be deactivated employing an acid or an acid chloride. The acids such as hydrochloric acid, sulfuric acid, acetic acid, oxalic acid, phosphonic acid, methanesulfonic acid, trifluoromethanesulfonic acid, benzene, toluene or xylene sulfonic acids, acid chlorides such as acetyl or benzoyl chloride, and sulfonyl chlorides such as benzene, toluene or xylene sulfonyl chloride may be employed. Another series of deactivators are alkylating agents such as dimethyl sulfate, o, or p-alkyl toluenesulfonates, methyl chloride may also be employed.

The solvents which may be employed are those in which the organic polyisocyanates are soluble. These include, for example, acetone, acetonitrile, acetophenone, allyl acetate, benzyl cellosolve, bromobenzene, o-bromostyrene, o-bromotoluene, p-bromotoluene, butyl acetate, 2-butyl acetate, butyl benzoate, butyl cellosolve acetate, N-butylcyclohexane, carbon tetrachloride, cellosolve acetate, 2-chloro-1,3-butadiene, chloroform, cyclohexane, cyclohexanone, dibutyl cellusolve, dibutyl maleate, dibutyl phthalate, o-dichlorobenzene, m-dichlorobenzene, p-dichlorobenzene, 1,1-dichloroethane, dichloromethane, 1,1-diethoxybutane, 1,1-diethoxyethane, diethyl cellosolve, diethyl maleate, diethyl phthalate, diethyl pimelate, diethyl succinate, diglycol diacetate, 1,3-dimethoxybutane, 1,1-dimethoxyethane, 3,3-dimethyl-2-butanone, 3,3-dimethylbutyl acetate, dimethyl cellosolve, dimethyl phthalate, dimethyl pimelate, 2,5-dimethyltetrahydrofuran, 1,4-dioxane, 1,3-dioxolane, diphenyl ether, ethyl acetate, ethyl acrylate, ethyl butyrate, diethyl ether, ethyl formate, 2-ethylhexyl acetate, ethyl propionate, m-ethyltoluene, o-ethyltoluene, p-ethyltoluene, glyceryl triacetate, glycol diacetate, glycol dipropionate, 2-heptanone, 3-heptanone, 4-heptanone, 3-hepten-2-one, 2-heptyl acetate, 3-heptyl acetate, hexyl acetate, hexyl acrylate, hexylene glycol diacetate, hexyl hexanoate, methyl cellosolve acetate, 5-methyl-2-hexanone, methyl propionate, 3-methylthiophene, 2-methylthiophene, 2-octanone, 3-pentanone, phenyl cellosolve acetate, propyl acetate, propylene dichloride, toluene, 1,1,2-trichloroethane, trichloroethylene, 1,2,3-trichloropropane, m-xylene, o-xylene, p-xylene, dimethyl formamide, dimethyl acetamide, dimethyl sulfoxide, N-methyl pyrrolidone, tetramethylene sulfone. Precipitating nonsolvents which may be employed are: decane, 2,2-dimethylbutane, 2,3-dimethylbutane, 2,2-dimethylhexane, 2,3-dimethylhexane, 3,3-dimethylhexane, 3,4-dimethylhexane, 2,5-dimethylhexane, 2,2-dimethylpentane, 2,3-dimethylpentane, 2,4-dimethylpentane, 3,3-dimethylpentane, 2,2-dimethylpropane, ethylcyclohexane, ethylcyclopentane, 3-ethylhexane, heptane, 1-heptene, 3-hepten-2-one, 1-hexene, 2-methylheptane, 3-methylheptane, 4-methylheptane, 2-methylhexane, 3-methylhexane, 2-methylpentane, 3-methylpentane, 4-methyl-2-pentene,cis, 4-methyl-2-pentene, trans, octane, 1-octene, and pentane.

In accordance with the present invention, rigid, flexible, and microcellular foams may be prepared by the catalytic reaction of organic polyisocyanates with polyols containing therein the dispersed polyisocyanurate polymer in the presence of blowing agents, surfactants and other additives which may be deemed necessary.

Non-cellular products may be prepared in the absence of blowing agents.

Typical polyols which may be employed in the preparation of the foams of the instant invention include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric sulfur-containing esters, polyacetals, aliphatic polyols or diols, ammonia, and amines including aromatic, aliphatic and heterocyclic amines as well as mixtures thereof. Alkylene oxide adducts of compounds which contain two or more difference groups within the above-defined classes may also be used such as amino alcohols which contain an amino group and a hydroxyl group. Also, alkylene oxide adducts of compounds which contain one —SH group and one —OH group as well as those which contain an amino group and a —SH group may be used. Generally, the equivalent weight of the polyols will vary from 100 to 10,000, preferably from 1000 to 3000.

Any suitable hydroxy-terminated polyester may be used such as are obtained, for example, from the reaction of polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-butyl-α-ethyl-glutaric acid, α,β-diethylsuccinic acid, isophthalic acid, terephthalic acid, hemimellitic acid, and 1,4-cyclohexanedicarboxylic acid. Any suitable polyhydric alcohol may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

Any suitable polyoxyalkylene polyether polyol may be used such as the polymerization product of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups. Included among the polyether polyols are polyoxyethylene, glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends as well as sequential addition of two or more alkylene oxides. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-bis(4-hydroxyphenyl)-propane and blends thereof having equivalent weights of from 100 to 5000.

Suitable polyhydric polythioethers which may be condensed with alkylene oxides include the condensation product of thiodiglycol or the reaction product of a dicarboxylic acid such as is disclosed above for the preparation of the hydroxy-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,2-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and diaminotoluene; aliphatic amines such as methylamine, triisopropanolamine, ethylene diamine, 1,3-diaminopropane, 1,3-diaminobutane, and 1,4-diaminobutane.

The polyurethane foams of the present invention may also be prepared by the reaction of an organic polyisocyanate with a graft polymer polyol containing therein the dispersed polyisocyanurate polymer of the invention in the presence of a blowing agent and optionally in the presence of additional polyhydroxyl-containing components, chain-extending agents, catalysts, surface-active agents, stabilizers, dyes, fillers and pigments. Suitable processes for the preparation of cellular polyurethane plastics are disclosed in U.S. Reissue Pat. No. 24,514 together with suitable machinery to be used in conjunction therewith. For the preparation of microcellular foams, blowing agents are generally not necessary. If desired for more expanded foams, they may be employed. When water is used, corresponding quantities of excess isocyanate to react with the water and produce carbon dioxide are necessary.

It is possible to proceed with the preparation of the polyurethane plastics by a prepolymer technique wherein an excess of organic polyisocyanate is reacted in a first step with the polyol containing the polyisocyanurate dispersion to prepare a prepolymer having free isocyanate groups which is then reacted in a second step with water to prepare a foam. Alternately, the components may be reacted in a single working step comonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol, and primary and secondary diamines which react more readily with the polyisocyanates than does water. These include phenylenediamine, ethylenediamine, diethylenetriamine, N-(2-hydroxypropyl)-ethylenediamine, N,N'-di(2-hydroxypropyl)ethylenediamine, piperazine, 2-methylpiperazine, isophrone diamine, 2,4-diamino-3,5-diethyltoluene and isomers thereof, 3,3',5,5'-tetraisopropyl-4,4'-diaminodiphenylmethane and the like, 4,4'-diaminodiphenylmethane, and 4,4'-diaminodicyclohexylmethane.

Any suitable catalyst for the polyurethane formation may be used including tertiary amines such as, for example, triethylenediamine, N-methylmorpholine, N-ethylmorpholine, diethylaminoethanol, N-laurylmorpholine, 1-methyl-4(dimethylaminoethyl)piperazine, 3-methoxy-N,N'-dimethylpropylamine, N,N,N'-trimethylisopropylpropylenediamine, N,N,N',N'-tetraethylpropylenediamine, dimethylbenzylamine, and the like. Other suitable catalysts are, for example, tin compounds such as stannous chloride, tin salts of carboxylic acids, such as dibutyltin di-2-ethyl hexanoate and stannous octoate, as well as other organo metallic compounds such as are disclosed in U.S. Pat. No. 2,846,408.

If desired, a surface-active agent may be employed. Numerous surface-active agents have been found satisfactory. Nonionic surface-active agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate esters, alkylsulfonic esters, and alkylarylsulfonic acids.

In the following examples, all parts are by weight unless otherwise designated and the following abbreviations are employed.

In the examples, the flame retardancy of the foam samples was determined by employing the California Bulletin No. 117 flame test. The specifications to pass this test are: after-flame, maximum 10 seconds, average $\leq 5$ seconds; char length, maximum 8 inches, average $\leq 6$ inches. Those foams which passed the average after-flame and char length specifications also passed the maximum after-flame and char length requirements.

TDH—1,3,5-tris(N,N'-dimethylaminopropyl)-s-hexahydrotriazine

Component A—a 1:1 propylene oxide:ethylene oxide adduct of n-butanol sufficient to give a hydroxyl number of 31.9

Component B—a 1:1 propylene oxide:ethylene oxide adduct of n-butanol sufficient to give a hydroxyl number of 76.8.

Component C—a propylene oxide adduct of n-butanol having a molecular weight of about 1626

Component D—a 1:1 propylene oxide:ethylene oxide adduct of n-butanol having a molecular weight of about 1927

Component E—a 1:1 propylene oxide:ethylene oxide adduct of n-butanol having a molecular weight of about 4186

Component F—an adduct of 1 mole of toluene diisocyanate with 2 moles of component C Component G—2,3-dibromoproanol Component H—2,2,2-trichloroethanol Component I—n-butanol Component J—an adduct of 1 equivalent of toluene diisocyanate with 1 equivalent of component A Component K—an adduct of 1 equivalent of toluene diisocyanate with 1 equivalent of component C Component L—an adduct of 1 equivalent of toluene diisocyanate with 1 equivalent of component D Component M—an adduct of 1 equivalent of toluene diisocyanate with 1 equivalent of component E Component O—an adduct of 1 equivalent of toluene diisocyanate with one-half equivalent of component B Component P—an adduct of 1 equivalent of toluene diisocyanate with one-half equivalent of component A Component Q—an adduct of 1 equivalent of toluene diisocyanate with one-half equivalent of component D Component R—an adduct of 1 equivalent of toluene diisocyanate with one-half equivalent of component E Polyol A—a propylene oxide-ethylene oxide adduct of a mixture of propylene glycol and glycerol having a hydroxyl number of 33 and containing 15 percent ethylene oxide Polyol B—a propylene oxide adduct of glycerine having a hydroxyl number of about 57

Polyol C—a propylene oxide-ethylene oxide adduct of a mixture of propylene glycol and glycerol having a hydroxyl number of 35 and containing 14 percent ethylene oxide Polyol D—a propylene oxide, ethylene oxide adduct of glycerol having a hydroxyl number of 35 and containing 16.5 percent ethylene oxide.

Polyol E—a propylene oxide, ethylene oxide adduct of trimethylolpropane having a hydroxyl number of 35 and containing 13 percent ethylene oxide.

L-5303—Silicone surfactant, a product of Union Carbide Corporation

DC-192—Silicone surfactant, a product of Dow Corning Corporation

T-12—Dibutyltin dilaurate, a product of M & T Corporation

DABCO WT—Amine catalyst, a product of Air Products Corporation

TDI—(80/20) 2,4-, 2,6-toluene diisocyanate

PAPI—Crude MDI
MDI—diphenylmethane diisocyanate

EXAMPLES 1-23

A reaction vessel equipped with a mechanical stirrer, thermometer, pressure equalized addition funnel, and a reflux condenser was purged with nitrogen and charged with 300 parts ethyl acetate and 100 parts of TDI. The isocyanate content of the solution at this stage was 12.5 percent by weight. The catalyst, TDH, in the amount of 0.4 part was added thereafter. An exotherm developed and reached about 40° C. The reaction mixture was then heated to 50° C. and maintained at that temperature for 3 hours. At this stage, the free isocyanate (NCO) content of the reaction mixture decreased to the value shown in Table I, the polymerization was then stopped by the deactivation of the TDH catalyst by adding 0.4 parts of benzoyl chloride and stirring the reaction mixture for another 15 minutes at 50° C. Then, while still maintaining the reaction temperature at 50° C., components 1 and 2, as specified in Table I, were added dropwise over a period of 0.5 hour to 1 hour. The reaction was further continued for another 2 hours at which time all the free NCO groups were substantially reacted. The reaction contents were then transferred into the indicated polyol while the polyol was being rapidly mixed with a homogenizer. Thereafter, the solvent was removed under reduced pressure and the residue was homogenized to yield a fine particulate dispersion. The viscosity values of the dispersions prepared are shown in Table I.

EXAMPLES 24-40

Into a reaction vessel as equipped in Examples 1-23, 100 parts of TDI and the indicated amount (Table II) of component 1 were placed and heated at 80° C. for one hour. The free isocyanate value of the product was determined to assure the completion of the reaction. Thereafter, 300 parts of ethyl acetate was added and the contents cooled to 25° C. TDH catalyst (0.4 gram) was then added. An exotherm developed to about 40° C. The reaction mixture was then heated to 50° C. and maintained at that temperature for 3 hours. At this stage, the free isocyanate content of the reaction mixture decreased to the value shown in Table II, the polymerization was then stopped by the deactivation of the TDH catalyst by adding 0.4 parts of benzoyl chloride and stirring the reaction mixture for another 15 minutes at 50° C. Then, while still maintaining the reaction temperature at 50° C., component 2, as specified in Table II, were added dropwise over a period of 0.5 hour to 1 hour. The reaction was further continued for another 2 hours at which time all the free NCO groups were substantially reacted. The reaction contents were then transferred into the indicated polyol while the polyol was being rapidly mixed with a homogenizer for another hour. Thereafter, the solvent was removed under reduced pressure and the residue was homogenized to yield a fine particulate dispersion. The viscosity values of the dispersions prepared are shown in Table II. All of the polyols in the Examples had a dispersion content of 20 percent except Example 38 which had a 15 percent dispersion content.

TABLE I

| Example | Initial NCO % | NCO % Initial Solution | Component 1 | Component 2 | % NCO After Reaction Component 1 | Polyol (Solids) % | Viscosity cps./25° C. |
|---|---|---|---|---|---|---|---|
| 1 | 12.1 | 3.7 | None | G (76.3) | — | A (20) | 1960 |
| 2 | 12.1 | 3.7 | None | G (75.7) | 0.18 | A (20) | 1940 |
| 3 | 12.1 | 3.3 | None | G (69.3) | 0.82 | A (20) | 5120 |
| 4 | 72.1 | 3.7 | E (10) | G (75.9) | 0.62 | C (20) | 1860 |
| 5 | 12.1 | 3.8 | E (20) | G (78.5) | 0.49 | C (20) | 1980 |
| 6 | 12.1 | 3.7 | D (20) | G (76.9) | 0.35 | C (20) | 2260 |
| 7[a] | 12.1 | 3.5 | E (20) | G (71.9) | 1.05 | C (20) | 3580 |
| 8[b] | 9.7 | 3.3 | F (10) | G (85.0) | 0.22 | C (20) | 3160 |
| 9[b] | 9.7 | 3.0 | B (10) | G (82.3) | 0.14 | C (20) | 2580 |
| 10[b] | 9.7 | 3.3 | B (10) | G (89.7) | 0.00 | C (30) | 5080 |
| 11[b] | 9.7 | 3.2 | B (10) | G (88.0) | 0.07 | D (20) | 3000 |
| 12[b] | 9.7 | 3.1 | B (10) | G (86.0) | 0.22 | E (20) | 3040 |
| 13[b] | 9.7 | 3.1 | B (10) | G (86.2) | 0.44 | C (20) | 2800 |
| 14[b] | 9.7 | 3.2 | B (10) | G (87.5) | 0.41 | D (20) | 3160 |
| 15[b] | 9.7 | 3.1 | B (10) | G (86.2) | 0.39 | D (20) | 2840 |
| 16[b] | 9.7 | 3.3 | B (10) | G (92.0) | 0.33 | D (20) | 3120 |
| 17 | 11.3 | 5.22 | None | H (55.6) | — | A (15) | 4720 |
| 18 | 11.3 | 5.07 | None | G (78.9) | — | A (20) | 2440 |
| 19 | 11.3 | 5.21 | None | G (81.1) | — | A (20) | 2120 |
| 20 | 11.3 | 4.86 | I (12.9) | G (37.8) | — | A (20) | 3800 |
| 21 | 11.3 | 5.19 | None | H (55.4) | — | A (20) | 1940 |
| 22 | 11.3 | 4.78 | None | G (37.2) | — | A (20) | 4720 |
| 23 | 12.1 | 3.86 | G (77.4) | A (20) | — | C (20) | 3500 |

[a] = 30 parts acetone solvent
[b] = a mixture of 300 parts of ethylacetate and 100 parts of toluene used as solvent

TABLE II

| Example | Component 1 | % NCO After Reaction Component 1 | % NCO Initial Solution | % NCO After Polymerization | Component 2 | Polyol | Viscosity cps./25° C. |
|---|---|---|---|---|---|---|---|
| 24 | B (5) | 45.0 | 11.1 | 3.7 | G (76.9) | A | 2720 |
| 25 | B (10) | 42.6 | 10.4 | 3.5 | G (73.6) | A | 2700 |
| 26 | B (20) | 38.5 | 9.2 | 3.3 | G (72.1) | C | 2020 |
| 27 | A (20) | 39.0 | 9.2 | 3.5 | G (76.9) | C | 2380 |
| 28 | C (10) | 43.1 | 10.5 | 3.8 | G (81.0) | C | 2580 |
| 29 | D (10) | 43.1 | 10.5 | 3.7 | G (77.6) | C | 2200 |
| 30 | E (10) | 43.1 | 10.5 | 3.9 | G (82.9) | C | 2460 |

TABLE II-continued

| Example | Component 1 | % NCO After Reaction Component 1 | % NCO Initial Solution | % NCO After Polymerization | Component 2 | Polyol | Viscosity cps./25° C. |
|---|---|---|---|---|---|---|---|
| 31 | E (10) | 43.2 | 10.5 | 3.8 | G (80.4) | C | 2160 |
| 32 | E (20) | 39.4 | 9.4 | 3.4 | G (74.7) | C | 3700 |
| 33 | E (20) | 39.3 | 9.4 | 3.9 | G (85.4) | C | 2460 |
| 34 | F (10) | — | 11.8 | 3.8 | G (79.9) | C | 2260 |
| 35 | F (10) | — | 11.8 | 3.9 | G (82.3) | C | 2480 |
| 36 | F (10) | — | 11.8 | 3.9 | G (83.6) | C | 2780 |
| 37 | F (10) | — | 11.8 | 3.8 | G (80.4) | C | 2260 |
| 38 | F (10) | — | 11.8 | 4.0 | G (84.6) | C | 2640 |
| 39 | B (5) | 45.0 | 11.3 | 5.0 | H (50.5) | A | 4400 |
| 40 | B (5) | 45.0 | 11.3 | 4.9 | G (77.3) | A | 2620 |

EXAMPLES 41–43

The procedure employed was essentially similar to that of Examples 23–39 except that the isocyanate was MDI and 500 grams of ethyl acetate solvent was used. The viscosity values of the dispersions are listed on Table III below. The concentration of dispersion in the polyol was 20 percent.

TABLE III

| Example | Component 1 | % NCO After Reaction Component 1 | % NCO Initial Solution | % NCO After Polymerization | Component 2 | % NCO After Reaction Component 2 | Polyol | Viscosity cps./25° C. |
|---|---|---|---|---|---|---|---|---|
| 41 | I (10) | 29.5 | 5.5 | 1.61 | G (50.9) | 0.13 | C | 4400 |
| 42 | B (10) | 29.5 | 5.5 | 2.2 | G (71.5) | 0.04 | C | 4160 |
| 43 | B (10) | 29.5 | 5.5 | 2.1 | G (71.5) | 0.04 | C | 4160 |

EXAMPLES 44–47

A reaction vessel equipped as in Examples 1–23 was charged with 300 parts of ethyl acetate and 100 parts of TDI. The indicated amount of component 1 was added with 0.4 parts TDH catalyst. An exotherm developed and reached about 40° C. The reaction mixture was then heated to 50° C. and maintained at that temperature for 3 hours. At this stage, the free isocyanate (NCO) content of the reaction mixture decreased to the value shown in Table I, the polymerization was then stopped by the deactivation of the TDH catalyst by adding 0.4 parts of benzoy 1 chloride and stirring the reaction mixture for another 15 minutes at 50° C. Then, while still maintaining the reaction temperature at 50° C., components 1 and 2, as specified in Table I, were added dropwise over a period of 0.5 hour to 1 hour. The reaction was further continued for another 2 hours at which time all the free NCO groups were substantially reacted. The reaction contents were then transferred into the indicated polyol while the polyol was being rapidly mixed with a homogenizer. Thereafter, the solvent was removed under reduced pressure and the residue was homogenized to yield a fine particulate dispersion. The viscosity values of the dispersions prepared are shown in Table IV. The solids content of the dispersion was 20 percent.

EXAMPLES B 48–82

The designated polyisocyanurate dispersion (300 grams), 9.0 grams of water, 4.0 grams of L-5303, 2.1 grams of Dabco WT were mixed for 30 seconds using a lightnin Model V-7 stirrer equipped with a 1.5 inch shrouded mixing blade. Whereupon 0.1 gram of T-12 was added and the mixture was mixed for another 15 seconds. A TDI/crude MDI (80/20) mixture was added, mixed for 5 seconds, poured into a one-gallon container and the foam was allowed to rise. The resulting foam was cured at 110° C. for 8 minutes. The polyisocyanurate dispersions employed and the physical properties of the foams are shown in Tables V, VI, VII and VIII below. Example 81 was prepared employing an MDI polyisocyanurate polymer prepared in a manner similar to the dispersion of Example 45 with the exception that no monofunctional active hydrogen compounds were reacted with the free NCO groups remaining in the polymer.

TABLE V

| Example | 48 | 49 | 50 | 51 | 52 |
|---|---|---|---|---|---|
| Dispersion of Example | 1 | 2 | 3 | 23 | 24 |
| Physical Properties | | | | | |
| Density, pcf. | 1.84 | 1.82 | 1.83 | 1.86 | 1.85 |
| Tensile strength, psi. | 13 | 14 | 15 | 14 | 16 |
| Elongation, % | 193 | 187 | 193 | 183 | 193 |
| Tear strength, pi. | 1.6 | 1.9 | 1.6 | 2.1 | 2.4 |
| ILD, lb./sq.in. (sample thickness 1 inch) | | | | | |
| load at 25% defl. | 1.0 | 0.8 | 0.9 | 1.2 | 1.3 |
| 50% | 1.8 | 1.5 | 1.7 | 2.1 | 2.4 |
| 65% | 2.5 | 2.2 | 2.5 | 2.9 | 3.4 |
| Sag factor | 2.59 | 2.82 | 2.70 | 2.42 | 2.64 |
| Guide factor | 0.5 | 0.4 | 0.5 | 0.6 | 0.7 |
| CLD, psi. | | | | | |
| load at 50% defl. | 0.37 | 0.36 | 0.37 | 0.53 | 0.48 |

TABLE IV

| Example | Component 1 | % NCO After Polymerization | Component 2 | % NCO After Component 2 Reaction | Viscosity cps./25° C. |
|---|---|---|---|---|---|
| 44 | O (10) | 3.74 | G (79.5) | 0.36 | 2240 |
| 45 | P (10) | 3.98 | G (82.5) | 0.42 | 2100 |
| 46 | Q (10) | 3.72 | G (79.1) | 0.45 | 2440 |
| 47 | R (10) | 3.86 | G (82.1) | 0.44 | 2600 |

TABLE V-continued

| Example | 48 | 49 | 50 | 51 | 52 |
|---|---|---|---|---|---|
| Compression set, % | | | | | |
| 50% compr. | 19.4 | 22.2 | 22.2 | 18.4 | 20.7 |
| California Flame Test | | | | | |
| av. char length, " | 1.7 | 2.9 | 2.3 | 2.5 | 2 |
| av. afterflame, sec. | 2.2 | 5.1 | 1.3 | 0.9 | 0 |

TABLE VI

| Example | 53 | 54 | 55 | 56 | 57 | 58 | 59 | 60 | 61 | 62 | 63 | 64 |
|---|---|---|---|---|---|---|---|---|---|---|---|---|
| Dispersion of Example | 25 | 26 | 27 | 28 | 29 | 30 | 4 | 5 | 6 | 7 | 31 | 32 |
| Physical Properties | | | | | | | | | | | | |
| Density, pcf. | 1.7 | 1.8 | 1.7 | 1.7 | 1.7 | 2.0 | 1.9 | 1.9 | 1.9 | 1.8 | 1.9 | 2.0 |
| Tensile, psi. | 12 | 12 | 11 | 13 | 10 | 11 | 13 | 13 | 13 | 13 | 13 | 14 |
| Elong., % | 157 | 147 | 147 | 163 | 137 | 147 | 167 | 143 | 147 | 160 | 160 | 173 |
| ILD, lb/sq.in. | | | | | | | | | | | | |
| (1 in. thick) | | | | | | | | | | | | |
| load at 50% defl. | 0.8 | 1.0 | 1.0 | 0.9 | 1.1 | 0.6 | 0.9 | 1.0 | 1.0 | 0.9 | 0.8 | 0.8 |
| 65% | 1.2 | 1.4 | 1.4 | 1.3 | 1.4 | 1.0 | 1.3 | 1.4 | 1.4 | 1.3 | 1.2 | 1.3 |
| CLD, psi. | | | | | | | | | | | | |
| load at 50% defl. | 0.26 | 0.32 | 0.32 | 0.42 | 0.32 | 0.25 | 0.37 | 0.38 | 0.43 | 0.38 | 0.34 | 0.40 |
| Compression set, | | | | | | | | | | | | |
| 50% compr. | 15 | 16 | 9 | 12 | 10 | 26 | 18 | 11 | 13 | 17 | 21 | 16 |
| Airflow, cfm. | | | | | | | | | | | | |
| 0.5 in. water | 1.40 | 1.27 | 2.05 | 1.30 | 2.52 | 0.99 | 1.34 | 1.66 | 1.39 | 2.90 | 2.18 | 1.78 |
| California Flame Test | | | | | | | | | | | | |
| avg. char length, in. | 2.5 | 2.5 | 2.7 | 2.6 | 2.9 | 2.3 | 2.7 | 3.4 | 3.2 | 3.2 | 3.3 | 2.8 |
| avg. afterflame, sec. | 0 | 0.8 | 0.1 | 0 | 1.6 | 0 | 0 | 0 | 2.9 | 0 | 0 | 0 |

TABLE VII

| Example | 65 | 66 | 67 | 68 | 69 | 70 | 71 | 72 | 73 | 74 | 75 | 76 |
|---|---|---|---|---|---|---|---|---|---|---|---|---|
| Dispersion of Example | 23 | 45 | 44 | 33 | 34 | 35 | 36 | 46 | 37 | 47 | — | 45 |
| Physical Properties | | | | | | | | | | | | |
| Density, pcf. | 2.0 | 1.7 | 1.8 | 1.6 | 2.3 | 2.0 | 1.8 | 2.1 | 1.8 | 2.0 | 1.48 | 1.77 |
| Tensile strength, psi. | 21 | 16 | 17 | 16 | 16 | 15 | 17 | 16 | 17 | 15 | 10.3 | 16.6 |
| Elongation, % | 167 | 170 | 203 | 180 | 177 | 163 | 170 | 163 | 173 | 160 | 117 | 180 |
| Tear strength, pi. | 2.6 | 1.8 | 1.8 | 1.6 | 1.9 | 1.8 | 1.7 | 1.6 | 1.9 | 1.7 | 0.6 | 1.7 |
| ILD, lb./sq.in. | | | | | | | | | | | | |
| 25% defl. | 0.8 | 0.6 | 0.5 | 0.4 | 0.7 | 0.6 | 0.6 | 0.5 | 0.5 | 0.5 | 0.3 | 0.4 |
| 65% | 2.0 | 1.5 | 1.3 | 1.0 | 1.8 | 1.5 | 1.4 | 1.5 | 1.5 | 1.5 | 0.9 | 1.3 |
| Sag Factor | 2.50 | 2.62 | 2.64 | 2.7 | 2.76 | 2.59 | 2.49 | 3.00 | 2.57 | 3.06 | 2.74 | 2.86 |
| Guide Factor | 0.4 | 0.3 | 0.3 | 0.2 | 0.3 | 0.3 | 0.3 | 0.2 | 0.3 | 0.2 | — | — |
| CLD, psi. | | | | | | | | | | | | |
| 50% defl. | 0.46 | 0.32 | 0.33 | 0.32 | 0.53 | 0.37 | 0.32 | 0.38 | 0.33 | 0.38 | 0.24 | 0.29 |
| Compression set, % | | | | | | | | | | | | |
| 50% compr. | 21 | 21 | 19 | 30 | 20 | 22 | 24 | 19 | 18 | 18 | 49 | 24 |
| Air flow, cfm. | 4.3 | 2.3 | 2.4 | 1.3 | 3.8 | 2.4 | 2.3 | 3.4 | 3.2 | 3.3 | 2.05 | 1.65 |
| Oxygen index | 22.1 | 21.1 | 21.7 | 22.1 | 21.5 | 22.7 | 21.7 | 21.5 | 22.3 | 22.3 | — | — |
| California Flame Test | | | | | | | | | | | | |
| avg. char length, in. | 0.4 | 1.3 | 0 | 3.2 | 0 | 2.2 | 2.4 | 2.5 | 0.3 | 1.1 | 12 | 3.1 |
| avg. afterflame, sec. | 2.6 | 3.0 | 1.9 | 2.4 | 2.6 | 3.4 | 2.8 | 2.9 | 2.4 | 2.9 | 17 | 1.7 |

TABLE VIII

| Example | 77 | 78 | 79 | 80 | 81 | 82 |
|---|---|---|---|---|---|---|
| Dispersion of Example | 17 | 19 | 38 | 40 | 41 | 22 |
| Physical Properties | | | | | | |
| Density, pcf. | 1.75 | 1.81 | 1.71 | 1.69 | 1.71 | 1.74 |
| Tensile strength, psi. | 10.4 | 13.3 | 10.1 | 8.4 | 12.3 | 13.4 |
| Elongation, % | 157 | 163 | 150 | 140 | 130 | 137 |
| Tear strength, pi. | 1.6 | 1.8 | 1.3 | 2.0 | 1.8 | 1.6 |
| ILD, psi. | | | | | | |
| (sample thickness 1 inch) | | | | | | |
| load at 50% defl. | 0.9 | 0.8 | 0.8 | 1.0 | 1.2 | 1.1 |
| 65% | 1.2 | 1.2 | 1.1 | 1.4 | 1.7 | 1.5 |
| CDL, psi. | | | | | | |
| load at 50% defl. | 0.28 | 0.25 | 0.25 | 0.32 | 0.36 | 0.34 |
| Compression sets, % | | | | | | |
| 50% | 23 | 15 | 29 | 8 | 14 | 12 |
| Air flow, cfm., 0.5" | | | | | | |
| water | 2.3 | 1.6 | 1.7 | 2.2 | 2.1 | 2.7 |
| California Flame Test | | | | | | |
| avg. char length, in. | 4.5 | 1.6 | 3.2 | 1.7 | 1.7 | 6.0 |
| avg. afterflame, sec. | 2.4 | 0 | 0.75 | 0 | 0 | 6.0 |

The embodiments of the invention in which an exclusive privilege or property is claimed are defined as follows:

1. A dispersible polyisocyanurate polymer prepared by (a) polymerizing an organic polyisocyanate in an organic solvent in the presence of an effective amount of a trimerization catalyst, (b) deactivating said catalyst, and (c) reacting the free isocyanate groups remaining in the polymer with a monofunctional halogenated alcohol.

2. A dispersible polisocyanurate polymer prepared by (a) partially reacting an organic polyisocyanate in an organic solvent with a monofunctional active hydrogen compound, (b) polymerizing the polyisocyanate of (a) in the presence of an effective amount of a trimerization catalyst, (c) deactivating said catalyst, and (d) reacting the free isocyanate groups remaining in the polymer with a monofunctional halogenated alcohol.

3. The dispersible polyisocyanurate polymer of claim 1 prepared in the presence of an adduct of equivalent quantities of an organic polyisocyanate, and a monofunctional active hydrogen compound.

4. The dispersible polyisocyanate polymer of claim 2 prepared in the presence of a dispersion stabilizer, an adduct of equivalent quantities of an organic polyisocyanate, and a monofunctional active hydrogen compound.

5. A dispersion of polyisocyanurate polymer in a polyol prepared by (a) polymerizing a solution of an organic polyisocyanate in an organic solvent in the presence of an effective amount of a trimerization catalyst, (c) deactivating said catalyst, (d) reacting the free isocyanate groups remaining in the polymer with a monofunctional halogenated alcohol, (e) mixing the product with a polyol, and (e) removing the organic solvent.

6. In a process for preparing a dispersible polyisocyanurate polymer by (a) polymerizing an organic polyisocyanate in an organic solvent in the presence of an effective amount of a trimerization catalyst and (b) deactivating said catalyst, the improvement comprising reacting the free isocyanate groups remaining in the polymer with a monofunctional halogenated alcohol.

7. In a process for preparing a dispersible polyisocyanurate polymer by (a) partially reacting an organic polyisocyanate with a monofunctional active hydrogen compound, (b) polymerizing the pre-reacted polyisocyanate in an organic solvent in the presence of an effective amount of a trimerization catalyst, and (c) deactivating said catalyst, the improvement comprising reacting the free isocyanate groups remaining in the polymer with a monofunctional halogenated alcohol.

8. The process of claim 6 wherein said polymerization is conducted in the presence of an adduct of equivalent quantities of an organic polyisocyanate, and a monofunctional active hydrogen compound.

9. The process for preparing the polymer of claim 7 wherein said trimerization is conducted in the presence of an adduct of equivalent quantities of an organic polyisocyanate, and a monofunctional active hydrogen compound.

10. In a process for preparing a dispersion of polyisocyanurate polymer in a polyol by (a) polymerizing an organic polyisocyanate in an organic solvent in the presence of an effective amount of a trimerization catalyst, (b) deactivating said trimerization catalyst, (c) reacting the free isocyanate groups remaining in the polymer with a monofunctional active hydrogen compound, (d) mixing the solution with a polyol, and (e) removing the organic solvent, the improvement comprising reacting the residual free isocyanate in step (c) with a halogenated alcohol.

11. The process of claim 10 wherein said polymerization is conducted in the presence of an adduct of equivalent quantities of an organic polyisocyanate and a monofunctional active hydrogen compound.

12. In a polyurethane foam prepared by the reaction of a polyol, an organic polyisocyanate, catalyst, blowing agent and optionally other additives, the improvement comprising the use of a dispersion in said polyol of the polymer prepared by the process of claim 7.

13. In a polyurethane foam prepared by the reaction of a polyol, an organic polyisocyanate, catalyst, blowing agent and optionally other additives, the improvement comprising the use of a dispersion in said polyol of the polymer prepared by the process of claim 8.

14. In a polyurethane foam prepared by the reaction of a polyol, an organic polyisocyanate, catalyst, blowing agent and optionally other additives, the improvement comprising the use of a dispersion in said polyol of the polymer prepared by the process of claim 9.

15. In a polyurethane foam prepared by the reaction of a polyol, an organic polyisocyanate, catalyst, blowing agent and optionally other additives, the improvement comprising the use of a dispersion in said polyol of the polymer prepared by the process of claim 10.

16. In a polyurethane foam prepared by the reaction of a polyol, an organic polyisocyanate, catalyst, blowing agent and optionally other additives, the improvement comprising the use of a dispersion in said polyol of the polymer prepared by the process of claim 11.

17. In a non-cellular polyurethane product prepared by the reaction of a polyol, an organic polyisocyanate, catalyst, and optionally other additives, the improvement comprising the use of a dispersion in said polyol of the polymer prepared by the process of claim 7.

18. In a non-cellular polyurethane product prepared by the reaction of a polyol, an organic polyisocyanate, catalyst, and optionally other additives, the improvement comprising the use of a dispersion in said polyol of the polymer prepared by the process of claim 8.

19. In a non-cellular polyurethane product prepared by the reaction of a polyol, an organic polyisocyanate, catalyst, and optionally other additives, the improvement comprising the use of a dispersion in said polyol of the polymer prepared by the process of claim 9.

20. In a non-cellular polyurethane product prepared by the reaction of a polyol, an organic polyisocyanate, catalyst, and optionally other additives, the improvement comprising the use of a dispersion in said polyol of the polymer prepared by the process of claim 10.

21. In a non-cellular polyurethane product prepared by the reaction of a polyol, an organic polyisocyanate, catalyst, and optionally other additives, the improvement comprising the use of a dispersion in said polyol of the polymer prepared by the process of claim 11.

* * * * *